(12) United States Patent
Savinell et al.

(10) Patent No.: US 9,208,904 B2
(45) Date of Patent: Dec. 8, 2015

(54) REINFORCEMENT FOR A NUCLEAR FUEL ASSEMBLY

(75) Inventors: Alan Savinell, Pittsburgh, PA (US); John D. Wood, Greensburg, PA (US); Larry C. Montgomery, Monroeville, PA (US); Ralph W. Tolino, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1702 days.

(21) Appl. No.: 12/103,010

(22) Filed: Apr. 15, 2008

(65) Prior Publication Data

US 2009/0257545 A1  Oct. 15, 2009

(51) Int. Cl.
*G21C 19/00* (2006.01)
*G21C 3/32* (2006.01)

(52) U.S. Cl.
CPC *G21C 3/32* (2013.01); *G21C 19/00* (2013.01); *Y02E 30/40* (2013.01)

(58) Field of Classification Search
USPC .................. 376/261, 453, 438, 440, 448, 437
See application file for complete search history.

(56) References Cited

U.S. PATENT DOCUMENTS

| 4,560,532 | A | * | 12/1985 | Barry et al. | 376/434 |
|---|---|---|---|---|---|
| 4,683,117 | A | * | 7/1987 | Carlson et al. | 376/449 |
| 5,524,031 | A | * | 6/1996 | Kilian | 376/261 |
| 5,533,076 | A | * | 7/1996 | Holden | 376/327 |
| 5,600,694 | A | * | 2/1997 | Broders | 376/446 |
| 6,356,614 | B1 | * | 3/2002 | Allen et al. | 376/437 |
| 6,636,578 | B1 | * | 10/2003 | Clark | 376/261 |
| 7,239,683 | B2 | | 7/2007 | Pabis et al. | |
| 2005/0135540 | A1 | | 6/2005 | Pabis et al. | |
| 2008/0004128 | A1 | * | 1/2008 | Chol | 473/296 |

* cited by examiner

*Primary Examiner* — Jack W Keith
*Assistant Examiner* — Marshall O'Connor
(74) *Attorney, Agent, or Firm* — Richard J. Coldren; Westinghouse Electric Company LLC (57) ABSTRACT

A tie rod for reinforcing a nuclear fuel assembly. The tie rod includes an outer, hollow tubular member that extends from above the top nozzle through the bottom nozzle of the fuel assembly and has an axially split lower tip with an enlarged end and an upper portion having a circumferential threaded region. An inner rod extends axially through the hollow of the outer tube and has a slightly enlarged tip which spreads the split tip of the outer tube to lock the split tip below the lower nozzle of the fuel assembly. A nut is turned down on the upper threaded portion of the outer hollow tube and staked in position to lock the tie rod in position.

17 Claims, 6 Drawing Sheets

REINFORCEMENT FOR A NUCLEAR FUEL ASSEMBLY

BACKGROUND OF THE INVENTION

1. Field of the Invention

The current invention relates to a method and apparatus for the structural reinforcement of a nuclear fuel assembly for a pressurized water reactor. More specifically, the current invention relates to a structural reinforcement member for reinforcing the connection between a top nozzle and bottom nozzle through an instrumentation tube that extends between the top nozzle and bottom nozzle of such a fuel assembly and the method of implementing same.

2. Description of the Prior Art

Fuel assemblies for pressurized water reactors are composed of a plurality of fuel rods which are supported between a top nozzle and a bottom nozzle. Interspersed in the plurality of fuel rods are guide thimbles which allow insertion of control rods containing neutron absorbent material into and out of the plurality of guide thimbles to help control the nuclear reaction. These fuel assemblies also contain a centrally located instrumentation tube which allows the insertion of in-core instrumentation during reactor operation. The thimbles and instrumentation tube project between the top and bottom nozzles. Between the top and bottom nozzles a plurality of spacer grids are positioned at intervals to provide lateral support and prevent destructive side-to-side movement of the individual fuel rods. The top nozzle is positioned at the top of the fuel assembly and connects to the guide thimbles via sleeves to allow the load of the entire fuel assembly to be carried from the bottom nozzle, up the guide thimbles to the top nozzle. The fuel assembly top nozzle and bottom nozzle are configured to aid in channeling coolant through the assembly during operation. In this configuration, the weight of the fuel rods is born by the guide thimbles and not by the fuel rods when the fuel assembly is lifted by the top nozzle.

When handling the fuel bundle, a fixture such as a refueling mast or grapple is connected to the top nozzle of the fuel assembly. When the fuel assembly is lifted, most of the weight of the fuel assembly is carried by the guide thimbles. Consequently, the structural integrity of the guide thimbles must be intact in order to safely move the fuel assembly.

In some cases, the structural integrity of the guide thimbles has proved not to be intact, or the guide thimbles may at least be of questionable structural integrity. Guide thimbles have experienced problems with the formation of defects that may be caused by, for example, intergranular stress corrosion cracking that may be induced by the service environment within the spent fuel pool where many of the irradiated fuel assemblies are typically stored when not in the reactor. If such cracks or other flaws are present or suspected to be present in the guide tubes, the structural integrity of the guide tubes must be improved in order to render the fuel bundle safe for handling.

Susceptible assemblies must be inspected by utilities prior to movement, and failure of the inspection means the assembly cannot be handled by normal means. There are over 18,000 potentially susceptible fuel assemblies at approximately 25 different plants. The decreasing storage space in spent fuel pools has caused utilities to seek a solution that allows the susceptible assemblies to be easily handled and loaded into storage casks.

Commonly two existing solutions are being utilized by utilities to address this problem. These solutions include fuel anchors and a fuel handling tool designed to engage and lift the fuel assembly below the top nozzle. Both these solutions allow for safe movement of the suspect fuel assemblies, but each of these methods has disadvantages. Use of fuel anchors requires the permanent removal of any fuel insert, i.e., rod cluster control assemblies, burnable poison rod assemblies, wet annular burnable absorbers, etc., currently stored in the fuel assembly. This means that the fuel inserts would need to be stored and eventually disposed of separately from the fuel assembly. The nozzleless handling tool requires fuel inserts to be removed during handling, but the inserts can be returned to the assembly for storage. Insert removal for handling adds significant time to the process and poses problems for utilities that lack the necessary space to store the inserts. Another disadvantage to the nozzleless handling tool is that the tool is not standard fuel handling equipment. Thus, in addition to purchasing the tool, utilities must utilize a new process and procedure for handling fuel.

As an alternative, a number of designs have been proposed for a fuel assembly tie rod that reinforces the connection between the thimble or bottom nozzle and the top nozzle. However, many of the designs are complicated to manufacture and use and require sophisticated operating procedures to install.

Therefore, it is an object to this invention to provide an improved design and installation procedure for an instrument tube tie rod that is relatively simple to manufacture and install.

Furthermore, it is an object of this invention to provide such a tie rod that will provide a secondary load path capable of carrying the entire weight of the fuel assembly.

SUMMARY OF THE INVENTION

To achieve the foregoing objects this invention provides a reinforcing member for a nuclear fuel assembly in the form of a tie rod. The tie rod comprises a hollow elongated tube having a threaded upper end and a flexible compressible lower end that extends within the centrally located instrumentation tube of the fuel assembly between the top nozzle and the bottom nozzle. An inner rod is disposed within the hollow of the tie rod that will spread the flexible compressible lower end when fully inserted. A locking mechanism is provided that engages the tie rod threaded end above the fuel assembly top nozzle and is locked in place against the upper surface of the top nozzle adaptor plate. The tie rod threaded end is then staked to prevent the locking mechanism from loosening when the locking mechanism is fully positioned.

In one preferred embodiment the locking mechanism is a nut that is threadedly engaged with the tie rod outer surface. Desirably, the flexible, compressible lower end of the tie rod comprises a lower tip having an axially slotted portion. Preferably the inner rod has a flared upper section that creates sufficient resistance against the inner surface of the tie rod to prevent the inner rod from moving under its own weight or handling loads during installation.

The invention further includes a reinforced nuclear fuel assembly having the foregoing tie rod and a method of reinforcing a nuclear fuel assembly with the foregoing tie rod.

The method of this invention further includes the steps of inserting the hollow tie rod assembly comprising the tie rod having an elongated axial dimension, threaded upper end, a flexible, compressible lower end and an outer surface, and an axially moveable inner rod disposed within the hollow of the tie rod and situated above the flexible, compressible lower end and a locking mechanism. The tie rod assembly is inserted through the top nozzle, through the instrumentation tube that extends between the top nozzle and the bottom nozzle and through the bottom nozzle. The inner rod is then driven axially to and through the flexible, compressible lower end of the tie rod to expand the lower end of the tie rod below the bottom nozzle. The tie rod is then pulled upward until the expanded lower end of the tie rod makes contact with the lower surface of the bottom nozzle top plate. The locking mechanism is then engaged with the tie rod outer surface above the upper surface of the top nozzle adaptor plate to anchor the expanded lower end of the tie rod in contact with the lower surface of the bottom nozzle top plate. Preferably the engaging step threadedly engages a nut with a complimentary thread on the outer surface of the tie rod and the nut is turned down until the nut makes contact with an upper surface of the top nozzle adaptor plate. Desirably, the threaded upper end of the tie rod is staked to lock the nut in position.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

In the following description, like reference characters designate like or corresponding parts throughout the several views of the drawings. Also, in the following description, it is to be understood that such directional terms as "forward", "rearward", "left", "right", "upwardly", "downwardly", and the like are words of convenience and are not to be construed as limiting terms.

Fuel Assembly

Figure 1:
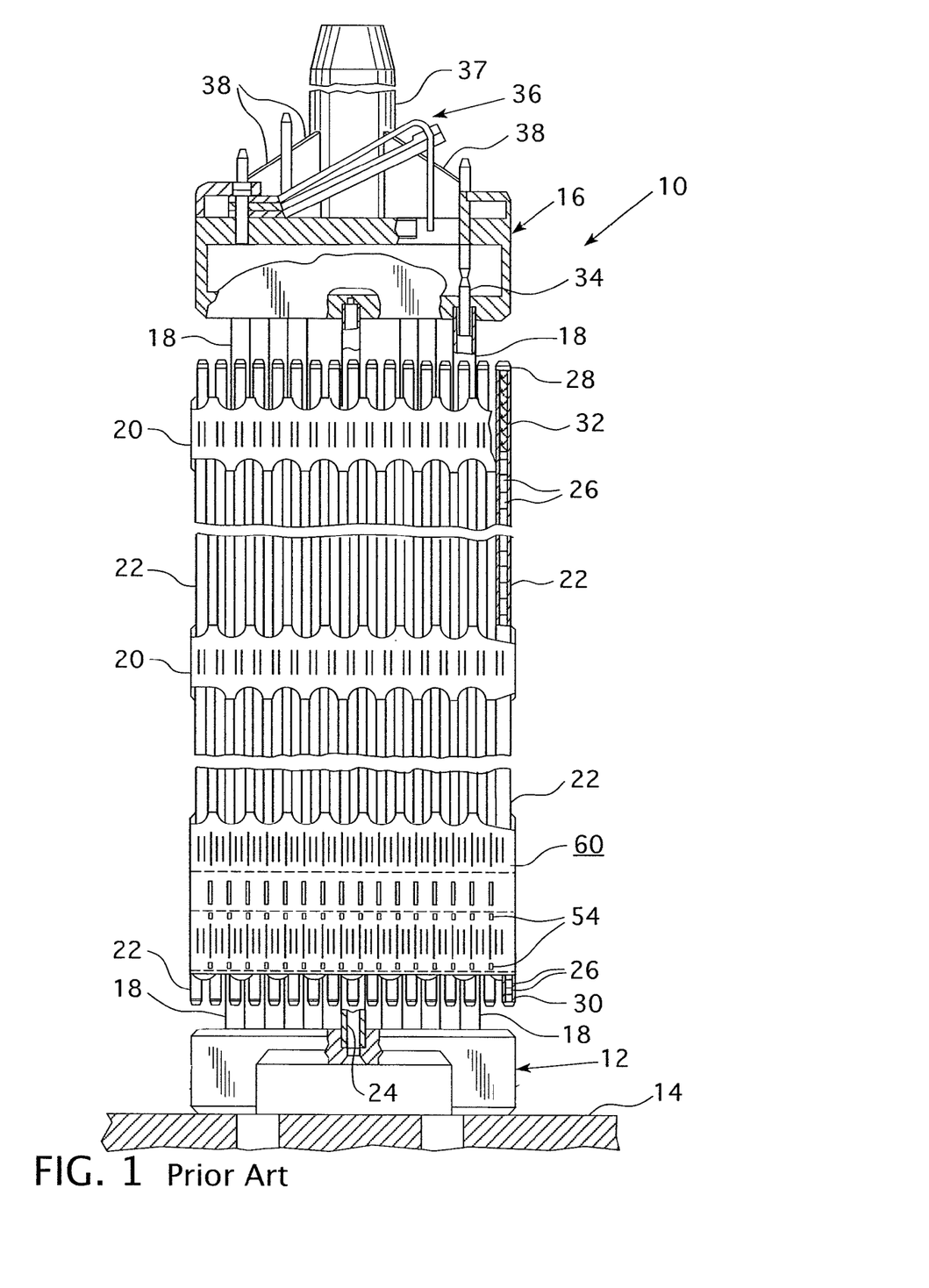
FIG. 1 is an elevational view, partially in section, of a fuel assembly that can benefit from the tie rod of this invention, the assembly being illustrated in vertically shortened form, with parts broken away for clarity.

Referring now to the drawings, in particularly FIG. 1, there is shown an elevational view of a nuclear fuel assembly, represented in vertically shortened form and being generally designated by reference character 10. The fuel assembly 10 is the type used in a pressurized water reactor and has a structural skeleton which, at its lower end, includes a bottom nozzle 12. During the operating life of the fuel assembly 10 the bottom nozzle 12 supports the fuel assembly 10 on a lower core support plate 14 in the core region of the nuclear reactor (not shown). In addition to the bottom nozzle 12, the structural skeleton of the fuel assembly 10 also includes a top nozzle 16 at its upper end and a number of guide tubes or thimbles 18 which extend longitudinally between the bottom and top nozzles 12 and 16 and at opposite ends are rigidly attached thereto.

The fuel assembly 10 further includes a plurality of transverse grids 20 axially spaced along, and mounted to, the guide thimbles 18 and an organized array of elongated fuel rods 22 transversely-spaced and supported by the grids 20. Also, the assembly 10 has an instrumentation tube 24 located in the center thereof and extending between, and mounted to, the bottom and top nozzles 12 and 16. With such an arrangement of parts, fuel assembly 10 forms an integral unit capable of being conveniently handled without damaging the assembly of parts.

As mentioned above, the fuel rods 22 in the array thereof in the fuel assembly 10 are held in spaced relationship with one another by the grids 20 spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly 10. The bottom nozzle 12 of the fuel assembly 10 passes the coolant upwardly along the fuel rods 22 of the assembly in order to extract heat generated therein for the production of useful work.

To control the fission process, a number of control rods 34 are reciprocally moveable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 which is coupled to a drive rod not shown and a plurality of radially-extending flukes or arms 38. Each arm 38 is interconnected to control rod 34 such that the control rod mechanism 36 is operable to move the control rods vertically in the guide thimbles 18 to thereby control the fission process in the fuel assembly 10, all in a well known manner.

In one embodiment of such a fuel assembly the guide thimbles 18 are fixedly attached to the grids 20 through a stainless steel sleeve that is welded or brazed to a grid 20 cell through which the guide thimble 18 passes. A bulge joint is typically made by expanding the guide thimble and sleeve in areas just above and below the grid 20 to fixedly couple the guide thimble 18 to the grid 20.

At North Anna in 2001 a spent fuel assembly was being lifted using a standard spent fuel handling tool and the top nozzle separated from the remainder of the fuel assembly. The cause of this incident was determined to be failure of the 304 stainless steel sleeves that connect the top nozzle to the top grid. It was determined that the sleeves failed at the bulge joints above the top grid due to intergranular stress corrosion cracking. Since the incident, it has been determined that there are more than 18,000 potentially susceptible fuel assemblies at approximately 25 plants.

As previously mentioned the alternatives that are currently being employed to lift such fuel assemblies without employing the top nozzle as essentially the main load path have a number of drawbacks. This invention overcomes those drawbacks by employing an instrument tube tie rod that forms a secondary load path and anchors the top nozzle to the bottom nozzle. The invention is a tie rod that is easy to install and extends from the top nozzle to the bottom nozzle reinforcing the connection between the top nozzle and the remainder of the fuel assembly. The tie rod is inserted through the center of the fuel assembly through the instrumentation tube. The center location and the compact design of the upper end of the tie rod allows inserts to be stored in the fuel assembly permanently after installation. Once the tie rod is installed, the fuel assembly can then be handled with standard spent fuel handling equipment and procedures.

Figure 2:
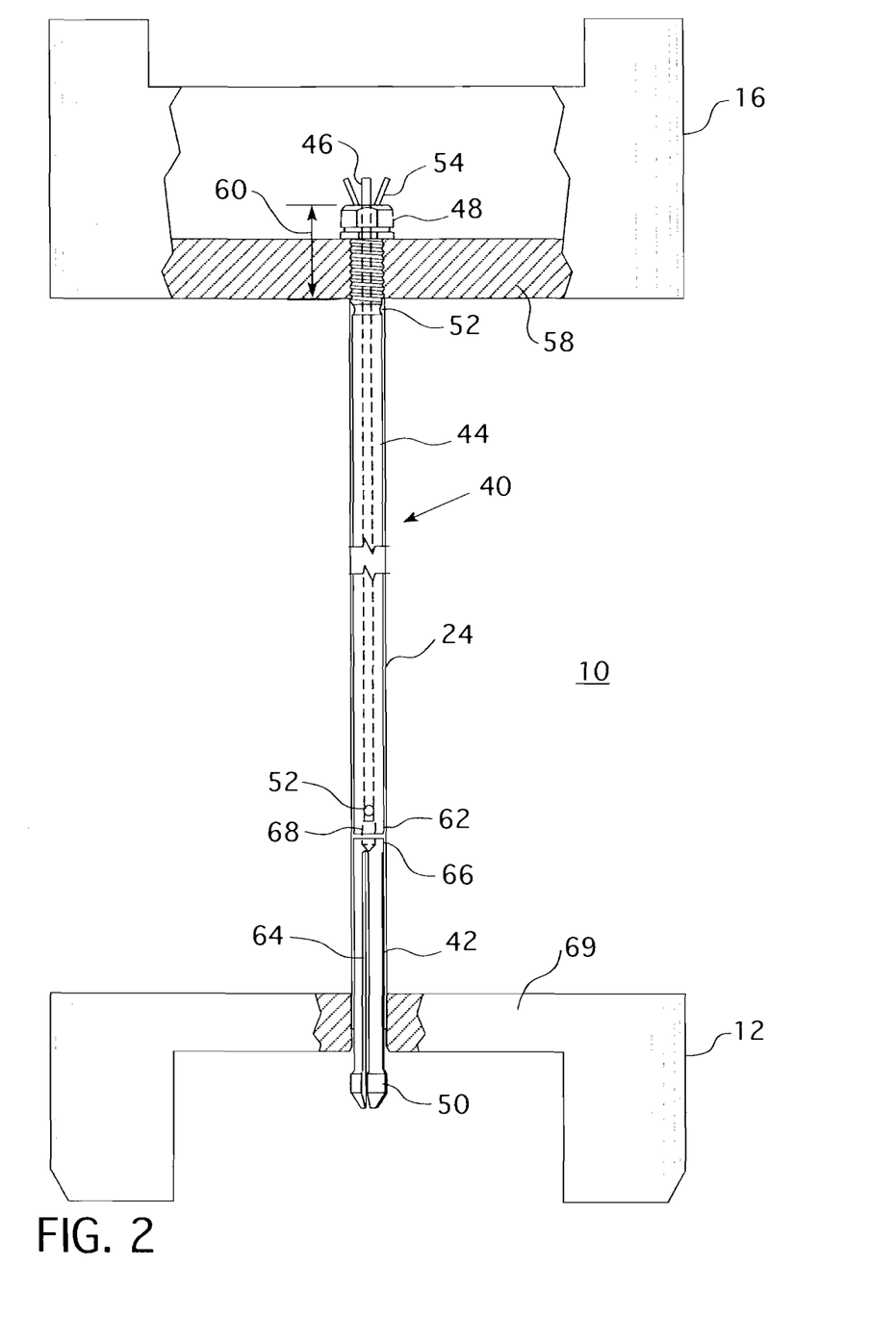
FIG. 2 is a schematic of the fuel assembly of FIG. 1 with the instrumentation tube spanning between the top nozzle and bottom nozzle with the tie rod of this invention being inserted therethrough.

The instrument tube tie rod 40 is shown in FIG. 2 inserted through the fuel assembly top nozzle 16 and bottom nozzle 12. The tie rod 40 includes a hollow outer tube 44 that has an upper section 60 with an external male thread that extends down to a thread relief 52. The outer hollow tubular section 44 has a lower end 62 with an internal female thread that mates with a correspondent male thread on the upper end of a hollow slotted tip 42. The slotted tip 42 is spot welded to the outer tubular member 44 at 52 to prevent disengagement during use. The slotted tip 42 has a slit 64 that extends diametrically through the hollow tip 42 from an upper end 66 through a lower flared end 50. The tie rod 40 further includes an inner rod 46 that has a flared section 54 that supports the inner rod 46 against the interior walls of the outer tube 44 and prevents the inner rod from moving under its own weight and handling loads while permitting the inner rod 46 to be driven by a remote tool (not shown) that provides a downward force on the upper tip of the inner rod 46. Alternately, the flared section 54 can be replaced by a bent or enlarged section that serves the same purpose. The inner rod 46 further includes a slightly enlarged bullet nose tip 68. The tie rod further includes a nut 48 that engages the threaded portion 60. As can better be appreciated from FIG. 6 the nut 48 includes diametrically opposed recesses that enable the nut to be locked in place when the threads of section 60 of the outer tube 44 are staked inside the recesses. Though the coupling between the hollow tube 44 and slotted tip is described as a screwed connection it should be appreciated that other coupling mechanisms may be employed, such as welding, or the tube 44 and tip 42 can be constructed as one member.

Before installation of the tie rod 40 any inserts, i.e., rod cluster control assemblies, burnable poison rod assemblies, wet annular burnable absorbers or thimble plugs, stored in the fuel assembly, must be removed and temporarily stored. A hole is machined in the center of the top nozzle adaptor plate 58 to gain access to the instrument tube 24. The method of machining preferably is electrical discharge machining because of its ability to control and collect debris, it is a proven technology and it is efficient. However, it should be appreciated that other machining methods could be employed to gain access to the instrumentation tube.

Figures 6, 7:
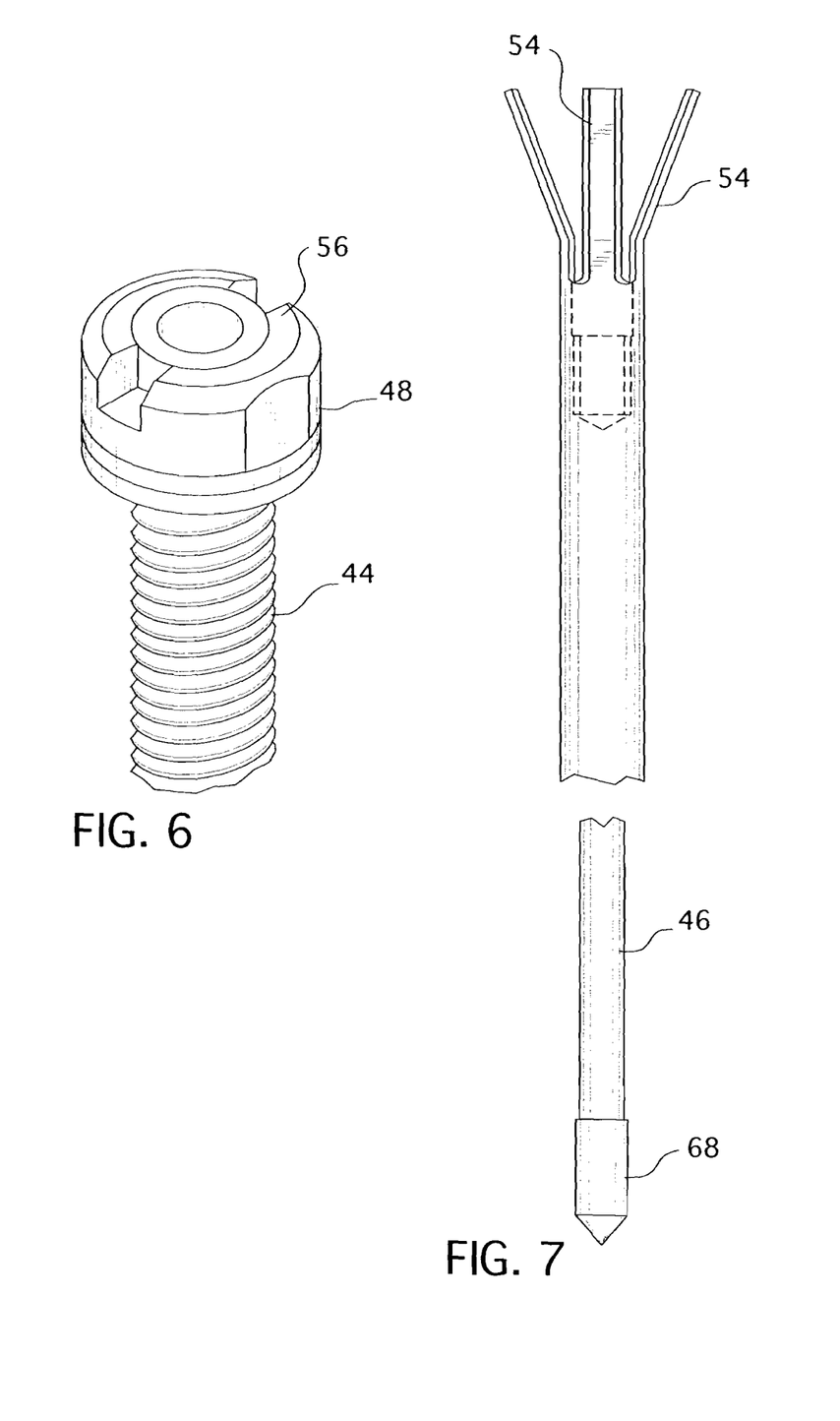
FIG. 6 is an elevational view of the upper portion of the tie rod showing the recesses in the upper surface of the nut where the tie rod is locked in position.
FIG. 7 is a side view of the embodiment of the inner rod having a flared upper end.

The tie rod assembly 40 is next inserted through the top nozzle 16 into the instrumentation thimble 24 as a complete assembly, i.e., including the inner rod 46 and nut 48. Inserting the tie rod as a complete assembly simplifies the installation tooling and the overall installation process. The slotted tip 42 allows the flared end 50 to flex inward as the tie rod 40 is being inserted into the instrument thimble 24. The inner rod design incorporates a flared section 54 as shown in FIG. 7 that holds the rod up during installation. The flared section 54 contacts the inner wall of the outer tube 44 and employs friction to prevent the inner rod 46 from moving under its own weight or handling loads. The tie rod 40 is fully inserted, as shown in FIG. 2 when the nut 48, at its upper position bottoms out on the upper surface of the top nozzle adaptor plate 58. This positions the flared end tip 50 below the bottom nozzle's top plate 69 which allows the tip 50 to expand.

Figure 3:
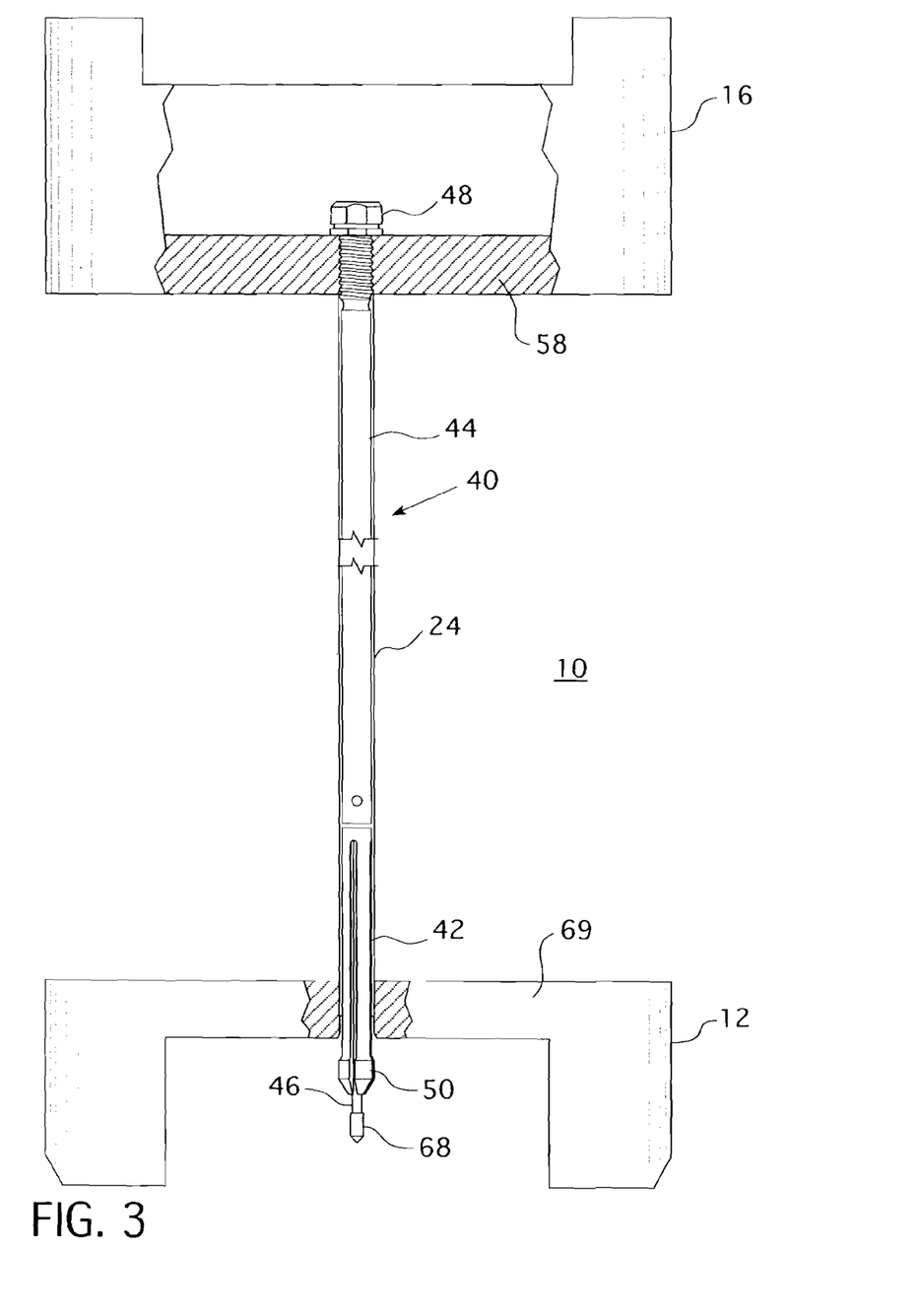
FIG. 3 is the schematic shown in FIG. 2 illustrating the step of driving the inner rod axially through the flexible lower end of the tie rod of this invention.
Figure 4:
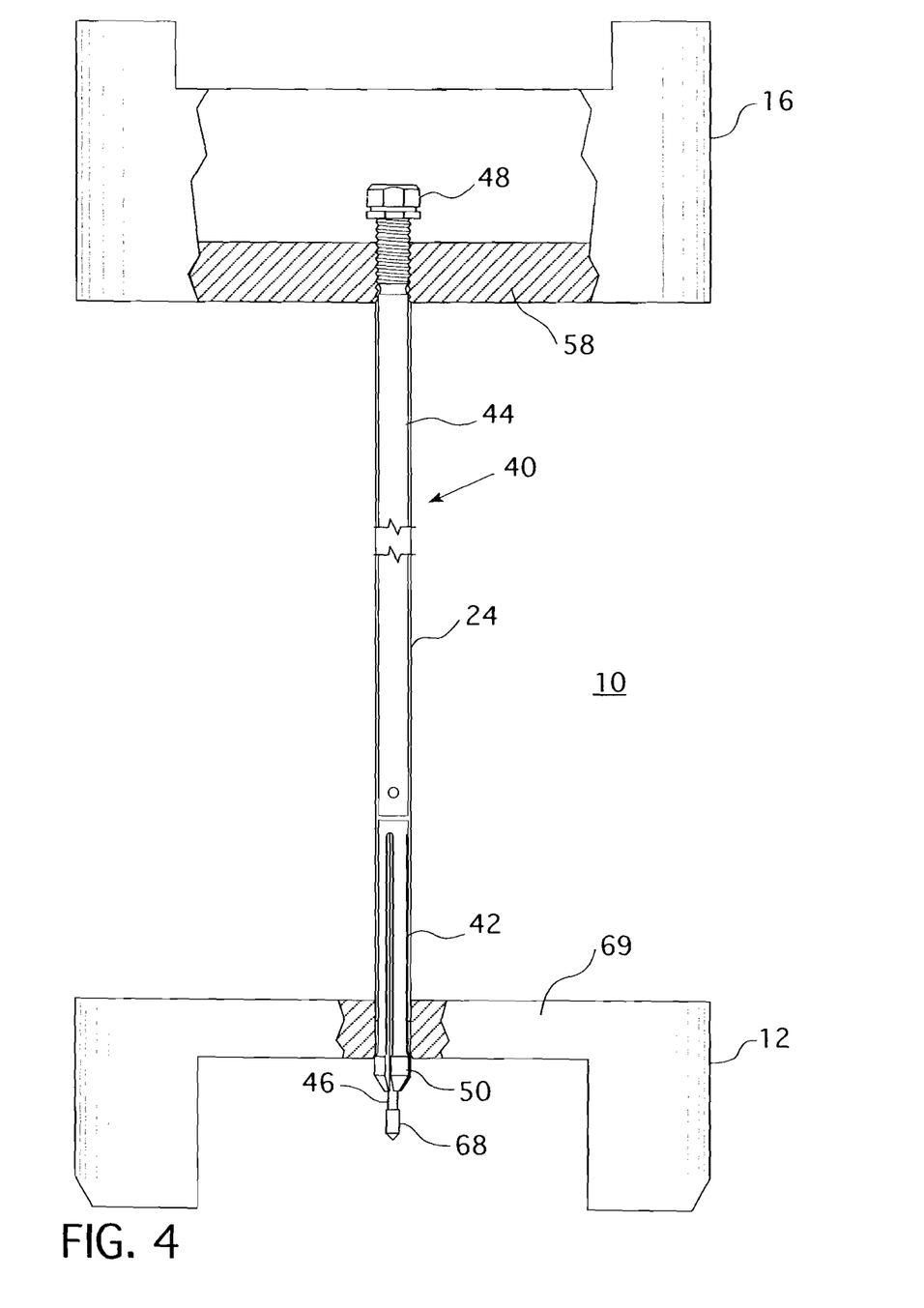
FIG. 4 is the schematic shown in FIG. 2 with the tie rod being pulled up against the lower nozzle after the inner rod has been driven through the lower flexible end.

Once the tie rod 40 is completely inserted into the fuel assembly 10 the inner rod 46 is pushed downward to lock the lower tip 50 in the expanded position as shown in FIG. 3. The installation tooling (not shown) provides a downward force to the inner rod 46 to overcome the resistance of the flared section 54 of the inner rod (shown in FIG. 2) or, alternatively, the enlarged section 54 shown in FIG. 7 at the upper end of the inner rod and completely seat the inner rod to lock the tip as shown in FIG. 3. The bottom of the inner rod contains a larger diameter region 68 that prevents the inner rod from inadvertently backing out should the fuel assembly 10 be placed horizontally for shipping. As shown in FIG. 4, the tie rod assembly 40 is pulled upward until the expanded lower tip 50 makes contact with the bottom surface of the top plate 69 of the fuel assembly bottom nozzle 12. This process step creates the secondary load path within the fuel assembly 10.

Figure 5:
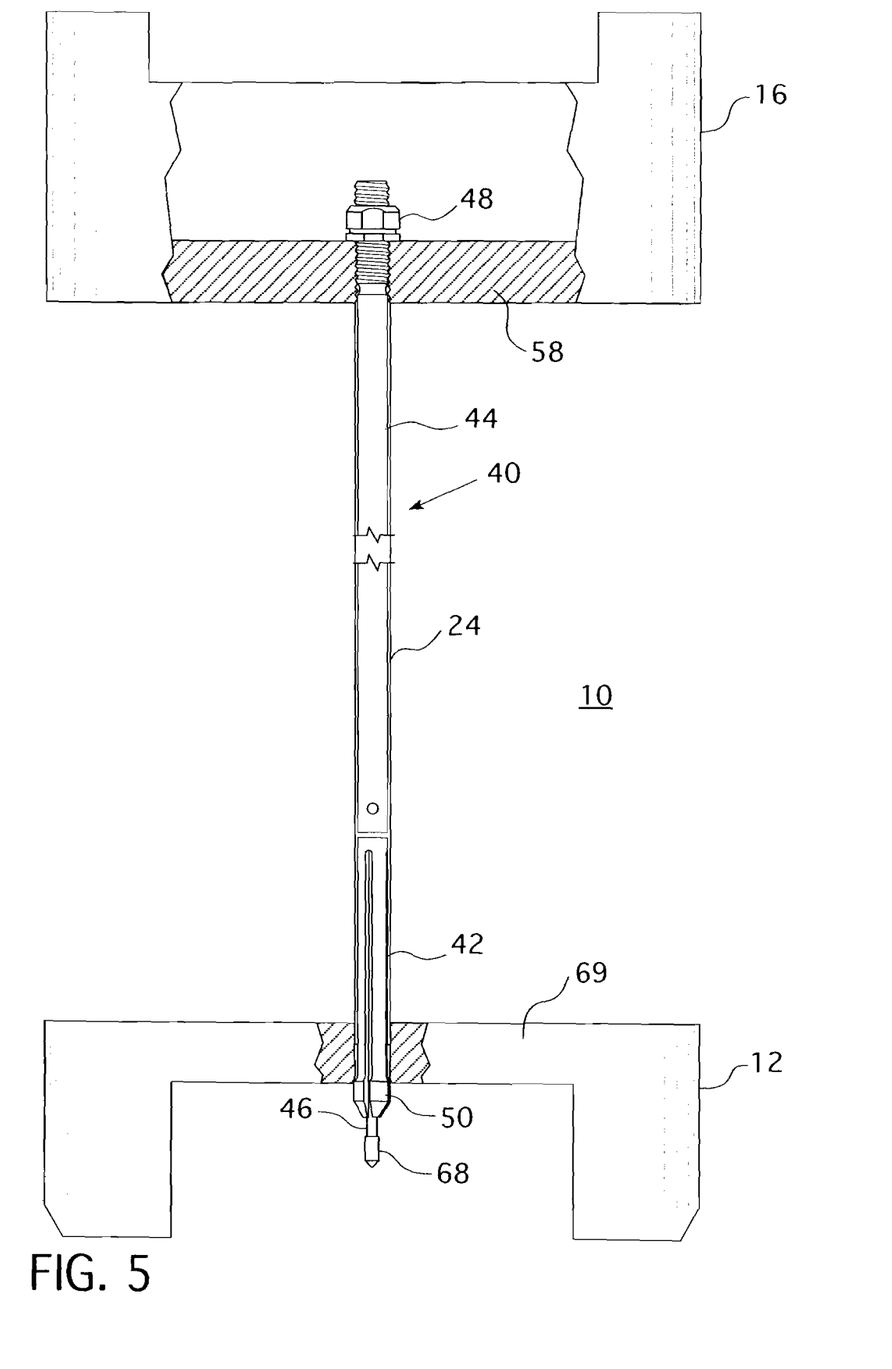
FIG. 5 is the schematic previously shown in FIG. 2 illustrating the step of this invention wherein the locking mechanism is threaded down the tie rod on to the upper surface of the top nozzle; and locked into position.

Next, as shown in FIG. 5, the nut 48 at the upper end of the outer tube 44 of the tie rod 40 is turned down until contact is made with the upper surface of the fuel assembly top nozzle adaptor plate 58. This process step locks the tie rod in place as a secondary load path within the fuel assembly 10.

Finally, the threads on the portion of the tie rod protruding above the nut are staked inside the recesses 56 in the nut 48 (shown in FIG. 6) to lock the nut 48 in place. Any inserts that had been removed and temporarily restored may now be returned to the fuel assembly.

Thus, the tie rod of this invention is relatively easy to install with a minimal number of steps. Once the tie rod has been installed fuel inserts can remain in the assembly during handling and storage and the assembly can be handled using standard fuel handling equipment and procedures.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalence thereof.

What is claimed is:

1. A reinforcing member for a nuclear fuel assembly having a tube extending between a top nozzle and a bottom nozzle, the reinforcing member comprising:

a hollow tie rod for insertion through the tube, the hollow tie rod having a threaded upper end and an enlarged, flexible, compressible lower end, an outer surface and a length that extends above and through a horizontal plate in the top nozzle, between the top nozzle and the bottom nozzle and through and below a horizontal plate in the bottom nozzle, when the reinforcing member is inserted through the tube in the nuclear fuel assembly, the enlarged. flexible, compressible lower end, in a neutral state in which no external compression or expansion force is applied, being larger than an opening in the horizontal plate in the bottom nozzle through which the lower end extends;

an inner rod disposed within the hollow of the tie rod that prevents the enlarged, flexible, compressible lower end from being compressed when the inner rod is fully inserted so that the flexible, compressible lower end extending below the horizontal plate in the bottom nozzle is larger than an opening in the bottom nozzle through which the hollow tie rod extends, the inner rod, when not fully inserted through the lower end of the tie rod, being full retractable within the hollow of the tie rod above the enlarged, flexible, compressible lower end; and a locking mechanism engaged with the tie rod outer surface above the horizontal plate in the top nozzle and locked in place to hold the tie rod securely in position within the rube and prevent the locking mechanism front loosening when the locking mechanism is fully positioned.

2. The reinforcement member of claim 1 wherein the locking mechanism is a nut threadedly engaged with the tie rod outer surface.

3. The reinforcement member of claim 1 wherein the flexible, compressible lower end of the tie rod comprises a lower tip having a slotted portion.

4. The reinforcement member of claim 3 wherein the tie rod has an elongated axial dimension and the slotted portion comprises two substantially diametrically opposed axial slots.

5. he reinforcement member of claim 1 wherein the inner rod has a flared upper section.

6. The reinforcement member of claim 1 wherein the tube extending between the top nozzle and the bottom nozzle is an instrumentation thimble.

7. A reinforced nuclear fuel assembly having a tube extending between a top nozzle and a bottom nozzle, comprising:
a hollow tie rod having a threaded upper end and an enlarged, flexible, compressible lower end, an outer surface and a length that extends through the tube from above and through a horizontal plate in the top nozzle, between the top nozzle and the bottom nozzle and through and below a horizontal plate in the bottom nozzle, the enlarged, flexible, compressible lower end, in a neutral state in which no external compression or expansion force is applied, being larger than an opening in the horizontal plate in the bottom nozzle through which the lower end extends;
an inner rod disposed within the hollow of the tie rod into the flexible, compressible lower end that prevents the flexible, compressible lower end from being compressed, so that the flexible, compressible lower end extending below the horizontal plate in the bottom nozzle is larger than an opening in the bottom nozzle through which the hollow tie rod extends, the inner rod, when not fully inserted through the lower end of the tie rod, being fully retractable within the hollow of the tie rod above the enlarged, flexible, compressible lower end; and
a locking mechanism engaged with the tie rod outer surface above the horizontal plate in the top nozzle and locked in place to hold the tie rod securely in position within the tube and prevent the locking mechanism from loosening when the locking mechanism is fully positioned.

8. A method of reinforcing a nuclear fuel assembly, having a tube extending between a top nozzle and a bottom nozzle, with a tie rod assembly including a hollow tie rod having an elongated axial dimension, a flexible, compressible lower end of the tie rod that in an uncompressed neutral state is larger than an inside diameter of the tube, an outer surface, an axially moveable inner rod disposed within the hollow of the tie rod situated above the flexible, compressible lower end and a locking mechanism to hold the tie rod securely in position within the tube when the locking mechanism is activated, the method comprising the steps of:
compressing the flexible, compressible lower end of the tie rod so it fits within the inside diameter of the tube;
inserting the tie rod assembly through the tube, the tie rod assembly extending through the top nozzle and through the tube that extends between the top nozzle and the bottom nozzle, so that the tie rod extends above and through a horizontal plate in the top nozzle, between the top nozzle and the bottom nozzle and through a. horizontal plate in the bottom nozzle with the flexible, compressible lower end of the tie rod extending below the horizontal plate in the bottom nozzle in the uncompressed neutral state;
driving the inner rod axially down to the flexible, compressible lower end of the tie rod to prevent the lower end of the tie rod below the horizontal plate in the bottom nozzle from being compressed so that the flexible, compressible lower end extending below the bottom nozzle horizontal plate is larger than an opening in the bottom nozzle through which the hollow tie rod extends;
pulling upwardly on the tie rod until the lower end of the tie rod makes contact with a lower surface of the bottom nozzle; and
activating a locking mechanism with the tie rod outer surface just at or above an upper surface of the top nozzle to hold the tie rod securely in position within the tube.

9. The method of claim 8 wherein the locking mechanism includes a nut and the tie rod has at least a portion of an outer surface threaded and the activating step comprises:
threadedly engaging the nut with the thread on the outer surface of the tie rod; and
turning down the nut until contact is made with the upper surface of the top nozzle.

10. The method of claim 9 including the step of staking the threads of the tie rod after the turning down step to lock the nut in position.

11. The method of claim 8 including the step of machining a hole in the top nozzle in line with the tube and sized to receive the tie rod there through.

12. The method of claim 11 wherein the machining step comprises machining the hole in the center of the top nozzle.

13. The method of claim 12 wherein the machining step is performed by electrical discharge machining.

14. The method of claim 8 including the step of removing a removable insert from the fuel assembly before the tie rod is inserted into the tube and reinserting the insert into the fuel assembly after the tie rod is secured by activation of the locking mechanism.

15. The method of claim 8 wherein the tube is an instrumentation tube.

16. A reinforcing member for a nuclear fuel assembly having a tube extending between a top nozzle and a bottom nozzle, the reinforcing member comprising:
a hollow tie rod for insertion through the tube, the hollow tie rod having an upper end and an enlarged, flexible, compressible lower end, an outer surface and a length that extends above and through a horizontal plate in the top nozzle, between the top nozzle and the bottom nozzle and through and below a horizontal plate in the bottom nozzle, when the reinforcing member is inserted through the tube in the nuclear fuel assembly, the enlarged, flexible, compressible lower end, in a neutral state in which no external compression or expansion force is applied, being larger than an opening in the horizontal plate in the bottom nozzle through which the lower end extends;
an inner rod disposed within the hollow of the tie rod that prevents the enlarged, flexible, compressible lower end from being compressed when the inner rod is fully inserted so that the flexible, compressible lower end extending below the horizontal plate in the bottom nozzle is larger than an opening in the bottom nozzle through which the hollow tie rod extends, the inner rod, when not fully inserted through the lower end of the tie rod, being fully retractable within the hollow of the tie rod above the enlarged, flexible, compressible lower end; and a locking mechanism engaged with the tie rod outer surface above the horizontal plate in the top nozzle and locked in place to hold the tie rod securely in position within the tube and prevent the locking mechanism from loosening when the locking mechanism is fully positioned.

17. A reinforced nuclear fuel assembly having, a tube extending between a top nozzle and a bottom nozzle, comprising:

a hollow tie rod having an upper end and an enlarged, flexible, compressible lower end, an outer surface and a length that extends through the tube from above and through a horizontal plate in the top nozzle, between the top nozzle and the bottom nozzle and through and below a horizontal plate in the bottom nozzle, the enlarged, flexible, compressible lower end, in a neutral state in which no external compression or expansion force is applied, being larger than an opening in the horizontal plate in the bottom nozzle through which the lower end extends;

an inner rod disposed within the hollow of the tie rod into the flexible, compressible lower end that prevents the flexible, compressible lower end from being compressed, so that the flexible, compressible lower end extending below the horizontal plate in the bottom nozzle is larger than an opening in the bottom nozzle through which the hollow tie rod extends, the inner rod, when not fully inserted through the lower end of the tie rod, being, fully retractable within the hollow of the tie rod above the enlarged, flexible, compressible lower end; and a locking mechanism engaged with the tie rod outer surface above the horizontal plate in the top nozzle and locked in place to hold the tie rod securely in position within the tube and prevent the locking mechanism from loosening when the locking mechanism is fully positioned.

* * * * *